(12) United States Patent  
Meenen et al.

(10) Patent No.: US 8,534,982 B2  
(45) Date of Patent: Sep. 17, 2013

(54) ROTATING LIFT SYSTEM AND METHOD

(75) Inventors: Don Patrick Meenen, Hiawatha, KS (US); David C. Benson, Hiawatha, KS (US); Michael A. Brainard, Hiawatha, KS (US)

(73) Assignee: Bestway, Inc., Hiawatha, KS (US)

( * ) Notice: Subject to any disclaimer, the term of this patent is extended or adjusted under 35 U.S.C. 154(b) by 290 days.

(21) Appl. No.: 13/018,077

(22) Filed: Jan. 31, 2011

(65) Prior Publication Data

US 2012/0195725 A1 Aug. 2, 2012

(51) Int. Cl.
*B60P 1/00* (2006.01)
*B60P 1/54* (2006.01)
*B60P 1/44* (2006.01)
*E02F 3/627* (2006.01)

(52) U.S. Cl.
CPC ............ *B60P 1/5433* (2013.01); *B60P 1/4414* (2013.01); *E02F 3/627* (2013.01)
USPC ............ 414/550; 414/556; 414/703; 414/680

(58) Field of Classification Search
USPC ...... 172/272, 273, 439; 280/416.2; 414/546, 414/547, 550, 552, 553, 555, 556, 687, 692, 414/703, 723, 742
See application file for complete search history.

(56) References Cited

U.S. PATENT DOCUMENTS

| | | | | |
|---|---|---|---|---|
| 3,727,698 | A | * | 4/1973 | Van Selus ...................... 414/703 |
| 3,904,054 | A | * | 9/1975 | van der Lely ................. 414/424 |
| 4,060,259 | A | | 11/1977 | Mefferd et al. |
| 4,286,918 | A | * | 9/1981 | Shannon ........................ 414/742 |
| 4,382,631 | A | * | 5/1983 | Johnson .................... 298/17 SG |
| 4,850,789 | A | * | 7/1989 | Zimmerman ................. 414/703 |
| 5,026,247 | A | * | 6/1991 | Zimmerman ................. 414/703 |
| 5,538,088 | A | * | 7/1996 | Wait ............................... 172/439 |
| 5,540,049 | A | * | 7/1996 | Lunzman ........................ 60/327 |
| 6,238,170 | B1 | * | 5/2001 | Pingry et al. .................. 414/550 |

OTHER PUBLICATIONS

"Retriever Self Loading Trailer", *Retriever Self Loading Trailer Operators Manual Mar./Apr. 2010*, (Mar. 1, 2010),1-24.

* cited by examiner

*Primary Examiner* — Saul Rodriguez
*Assistant Examiner* — Brendan Tighe
(74) *Attorney, Agent, or Firm* — Law Office of Mark Brown, LLC; Mark Brown; Christopher M. DeBacker

(57) ABSTRACT

A rotating lift system and method for transporting oversized agricultural implements. The rotating lift system includes a rotator arm, a rotator arm guide, an arcuate rotation track all mounted on a trailer frame. A load lift assembly is mounted on the rotator arm and is movable between lowered and raised positions and is adapted for connecting to a load. The rotator arm is pivotally connected to the trailer frame and rotates about a vertical axis. The rotator arm guide is connected to the opposing end of the rotator arm and engages the rotation track. The rotating lift system and method are adapted for engaging, lifting and rotating an implement and moving the implement between perpendicularly opposed field use and transport positions.

15 Claims, 18 Drawing Sheets

FIG. 7A (Load Lift Assbly Lowered)

FIG. 7B (Load Lift Assbly Raised)

(Load Lift Assbly Raised with 3-Point Hitch Implement)

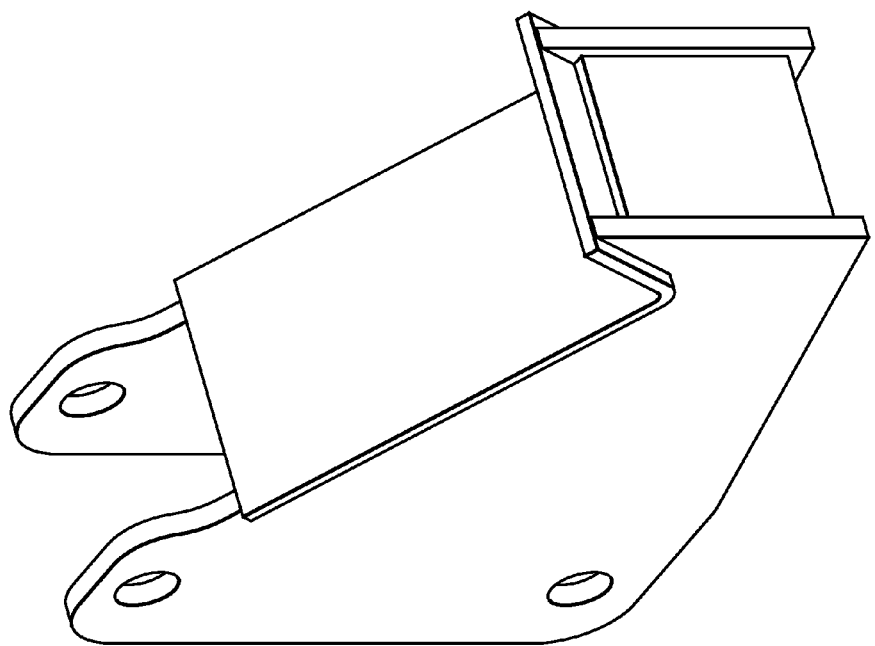
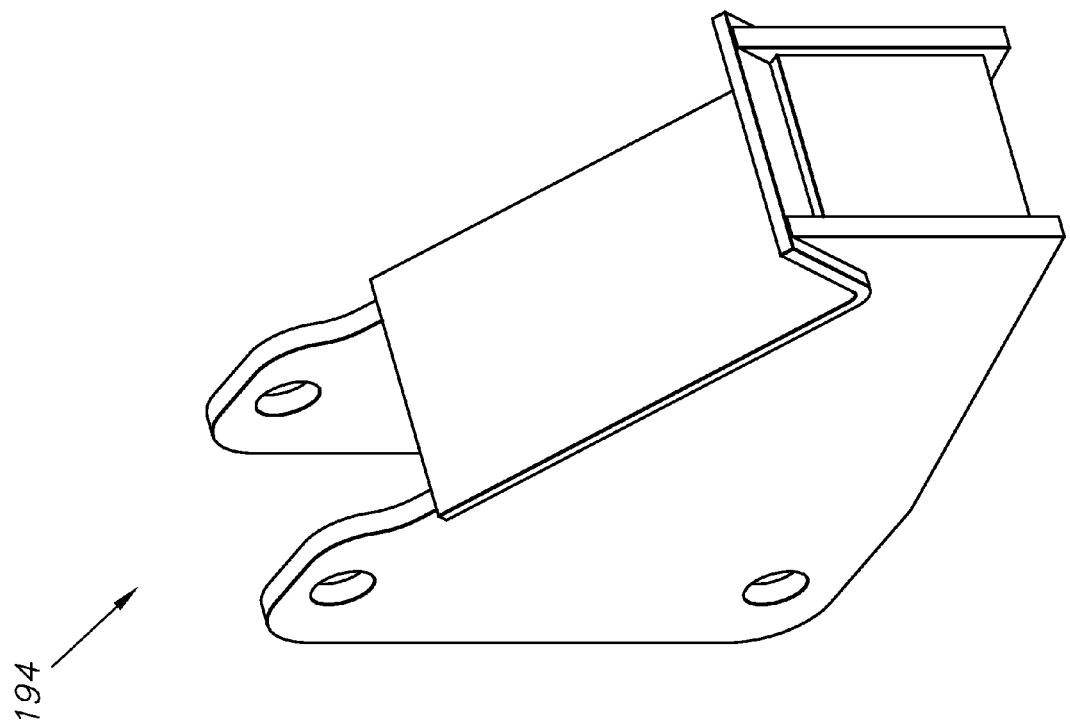
FIG. 16

ROTATING LIFT SYSTEM AND METHOD

BACKGROUND OF THE INVENTION

1. Field of the Invention

The present invention relates generally to a loading system for a vehicle, and particularly to a rotating lift system for loading and unloading equipment, such as combine heads and other agricultural implements, on trailers.

2. Description of the Related Art

Implements and equipment for tillage, cultivation and other agricultural operations have been developed with the objectives of increasing efficiency and lowering operating costs. For example, wider equipment tends to be more efficient because greater field areas can be covered with fewer passes in less time. Tractors have tended to become larger in order to accommodate such wider implements and their greater towing power requirements.

Modern agricultural operations commonly require equipment adapted for transporting over public roads. For example, many farmers and farming operations work multiple, noncontiguous fields with the same equipment, which must be configured to comply with traffic regulations, including maximum width requirements. Various implement transport mechanisms have been developed for this purpose. For example, implements are commonly designed to fold and unfold between field use and transport configurations.

Transporting oversize implements commonly involves placing them on transport vehicles, such as trailers, with their long dimensions generally aligned with the direction of travel. For example, the Mefferd et al. U.S. Pat. No. 4,060,259 shows an implement supported on auxiliary wheels and drawn by a vehicle attached to an end of the implement. Alternatively, an implement can be reoriented by a device that rotates it. For example, the Van Selus U.S. Pat. No. 3,727,698 discloses a trailer apparatus incorporating a turntable supported on a trailer body wherein a lift and support assembly is mounted on the turntable for lifting an implement and supporting it in an elevated position with the elongated dimension of the implement extending parallel to the direction of travel.

A further example is shown in the Shannon U.S. Pat. No. 4,286,918, which discloses an implement transporter including a trailer having a lifting and rotating mechanism for engaging, lifting and rotating an implement. The weight of the implement is supported by a roller, and the lifting mechanism is guided through an arcuate path-of-movement by an arm pivoted adjacent to one side of the trailer whereby the supported implement may be rotated 90 degrees relative to the trailer.

Yet another example is shown in the Pingry et al. U.S. Pat. No. 6,238,170, which describes an implement transporter including a trailer having a lifting and rotating mechanism for engaging, lifting and rotating the implement. The trailer includes a turntable supporting a cantilevered arm and the cantilevered arm includes a lift and support assembly.

Heretofore there has not been available a rotating lift mechanism with the advantages and features of the present invention.

BRIEF SUMMARY OF THE INVENTION

In the practice of an aspect of the present invention a rotator arm, a rotator arm guide, an arcuate rotation track and a load lift assembly are provided for engaging, lifting and rotating an implement, thereby moving the implement between perpendicularly opposed field use and transport positions. The rotator arm is connected to a pivot member for rotation about a vertical axis. The rotator arm guide is connected to the opposite end of the rotator arm. The rotator arm guide is adapted for engaging and moving along the rotation track. The load lift assembly is mounted on the rotator arm and is adapted for engaging an implement's three point hitch or header attachment and lifting the implement or header.

BRIEF DESCRIPTION OF THE DRAWINGS

The drawings constitute a part of this specification and include exemplary embodiments of the present invention illustrating various objects and features thereof.

FIG. 16 is an enlarged, isometric view, particularly showing modified header adapter brackets.

DETAILED DESCRIPTION OF THE PREFERRED EMBODIMENTS

I. Introduction and Environment

Figure 1:
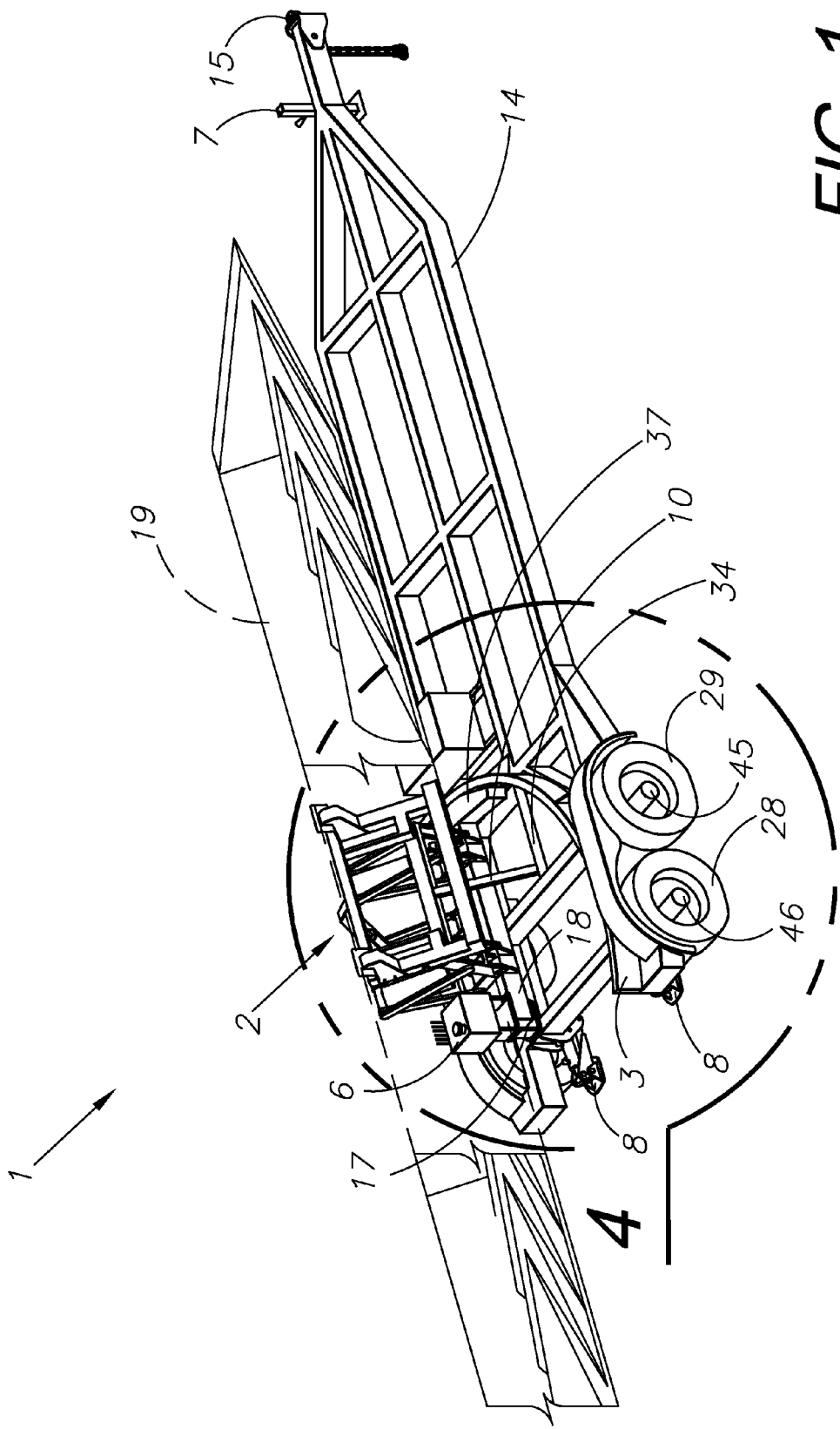
FIG. 1 is an isometric view of a rotating lift system embodying an aspect of the present invention.
Figure 2:
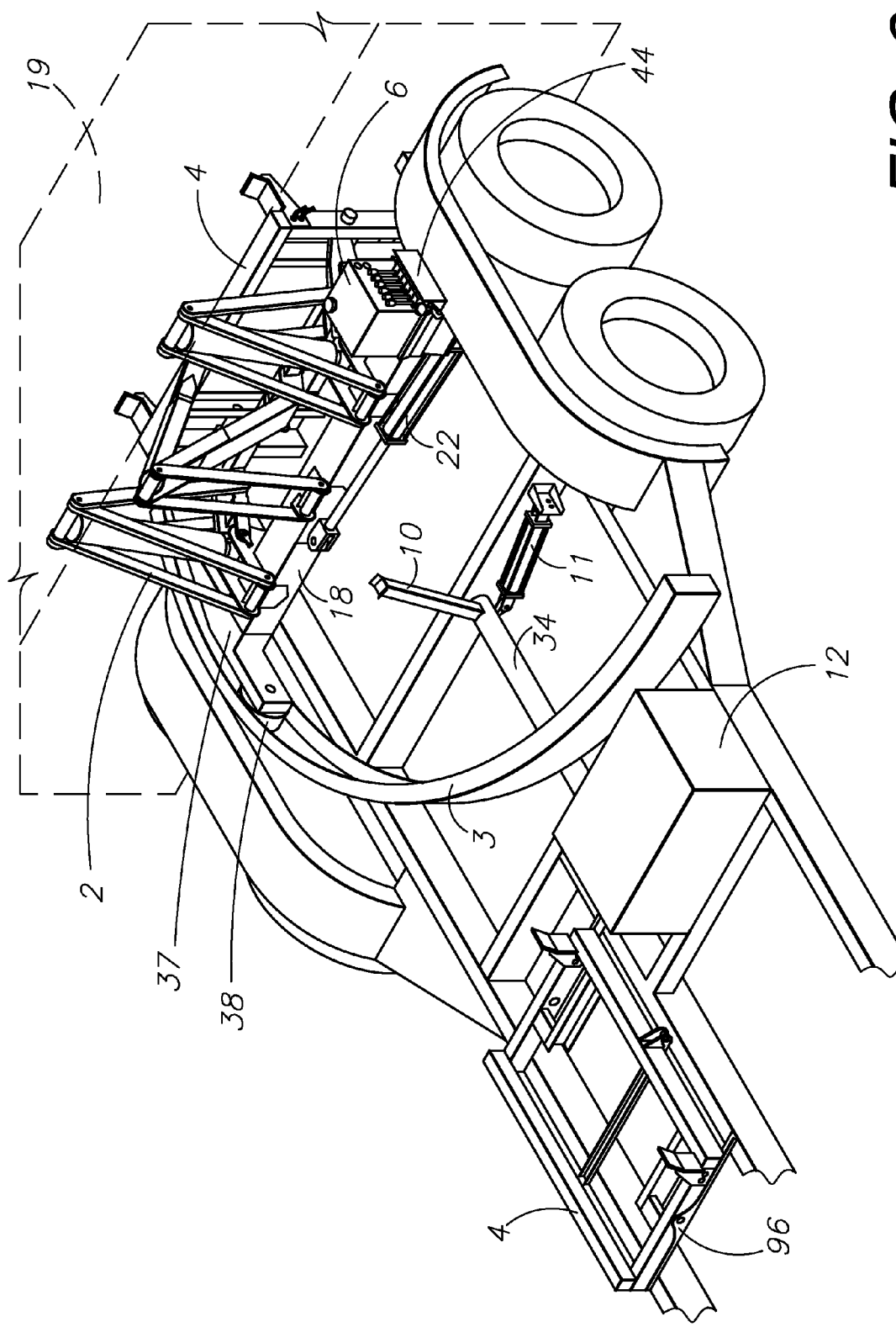
FIG. 2 is an isometric view of the rotating lift system with the load lift assembly in a lowered, loading position.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment or Aspect of the Self Loading Trailer

Referring to the drawings in more detail; the reference numeral 1 generally designates a rotating lift system embodying the present invention, as shown in FIGS. 1-17. Without limitation on the range of useful applications of the rotating lift system 1, an exemplary application is disclosed comprising: a trailer frame 14 inlcuding a rear set of wheels 28 mounted on a rear axle 46 and a forward set of wheels 29 mounted on a forward axle 45, the axles 45 and 46 being mounted on the trailer frame 14; a pair of stabilizers 8 mounted on the rear of the trailer frame 14; and a jack 7 mounted on the front of the trailer frame 14. The trailer frame 14 supports a rotator arm 18, a rotator arm guide 37, a pin assembly 17, an engine 13, an engine enclosure 12 and a rotation track 3.

The pin assembly 17 is mounted on a side of the trailer frame 14 and includes a pin assembly housing 16, a rotator arm pin 24 and a rotation cylinder pin 25. The rotator arm 18, having a first end 35 and a second end 36, is rotatably connected on its first end 35 to the pin assembly 17 at the rotator arm pin 24 and is rotatable about a vertical axis between a first, load position shown in FIGS. 2 and 3 and a second, transport position shown in FIG. 4. The second end 36 of the rotator arm 18 is attached to rotator arm guide 37. The rotator arm guide 37 engages the rotation track 3 with guide wheels 38. The rotation track 3 is mounted on the trailer frame 14 and is arcuately shaped and concentric with the vertical axis of rotation of the rotator arm 18.

A rotation cylinder 22 connects to the pin assembly 17 at a rotation cylinder pin 25 and connects to the rotator arm 18 at a cylinder arm connection pin 23. The rotation cylinder 22 actuates the movement of the rotator arm 18 between its first and second positions. A load lift assembly 2 is mounted on the rotator arm 18 with a pair of lift arm attachment brackets 30 and a top link attachment bracket 31. The load lift assembly 2 comprises a pair of lower linkage subassemblies 50, a lift arm crossbar 58 and an upper linkage subassembly 70.

Referring to FIGS. 7A and 7B, the lower linkage subassemblies 50 are each attached to the rotator arm 18 by a pair of lift arm attachment brackets 30. Each lower linkage subassembly 50 comprises the pair of lift arm attachment brackets 30, a pair of forward lower link members 54, a lower linkage pin 53, a lift cylinder pin 57, a pair of rearward lower link members 55, a lower lift arm linkage pin 59, a pair of lower lift arm linkage members 56, a lift arm pin 52, a lift arm 51, a lower connector 60 and a lift cylinder 20. For each lower linkage subassembly 50, the forward lower link members 54 are each movably connected on one end to the lift arm attachment brackets 30 by the lower linkage pin 53 and are attached on their respective opposite ends to the rearward lower link members 55 by the lift cylinder pin 57, the rearward lower link members 55 each being attached on their respective opposite ends to the lower lift arm link members 56 by the lower lift arm linkage pin 59. For each lower linkage subassembly 50, the lower lift arm link members 56 are each attached on one end to the lift arm attachment brackets 30 by the lift arm pin 52. For each lower linkage subassembly 50, the lower lift arm 51 is attached to the lower lift arm link members 56 and the lower connector 60 is attached to the end of the lower lift arm 51. The lower connectors 60 are adapted for connecting to a three-point hitch. The lower linkage subassemblies 50 are connected by the lift arm crossbar 58, which is attached on either end to the lower lift arms 51. For each lower linkage subassembly 50, the lift cylinder 20 is attached on one end to the lift arm pin 52 and on the opposite end to the lift cylinder pin 57. The lift cylinders 20 actuate the lifting movement of the load lift assembly 2 between its first, lowered position (FIG. 7A) and its second, raised position (FIG. 7B).

The upper linkage subassembly 70 is attached to the rotator arm 18 by a pair of top link attachment brackets 31. The upper linkage subassembly 70 comprises the pair of top link attachment brackets 31, a pair of forward upper link members 72, an upper linkage pin 71, a top link pin 73, an upper lift arm 74, a cross bar pin 75, a pair of upper third arm link members 76, an upper link slide arm tube 77, an upper link slide arm 78, an upper connector 79 and a top link cylinder 26. The forward upper link members 72 are each attached on one end to the top link attachment brackets 31 and are each attached on their respective opposite ends to the end of the upper lift arm 74 by the top link pin 73. The upper lift arm 74 is attached on its opposite end to the lift arm crossbar 58 by the crossbar pin 75. The upper third arm link members 76 are each attached on one end to the ends of the forward upper link members 72 and the end of the upper lift arm 74 by the top link pin 73. The pair of upper third arm link members 76 opposite ends are each attached to the top link slide arm tube 77. The top link slide arm 78, having a first end and a second end, is slidably seated inside the top link slide arm tube 77. The top link cylinder 26 is attached on one end to the top link pin 73 and is attached on its opposite end to the first end of the top link slide arm 78. The upper connector 79 is attached to the second end of the top link slide arm 78 and is adapted for connecting to a three point hitch. The top link cylinder 26 actuates the movement of the top link slide arm between its first, extended position and its second, retracted position.

Figure 8:
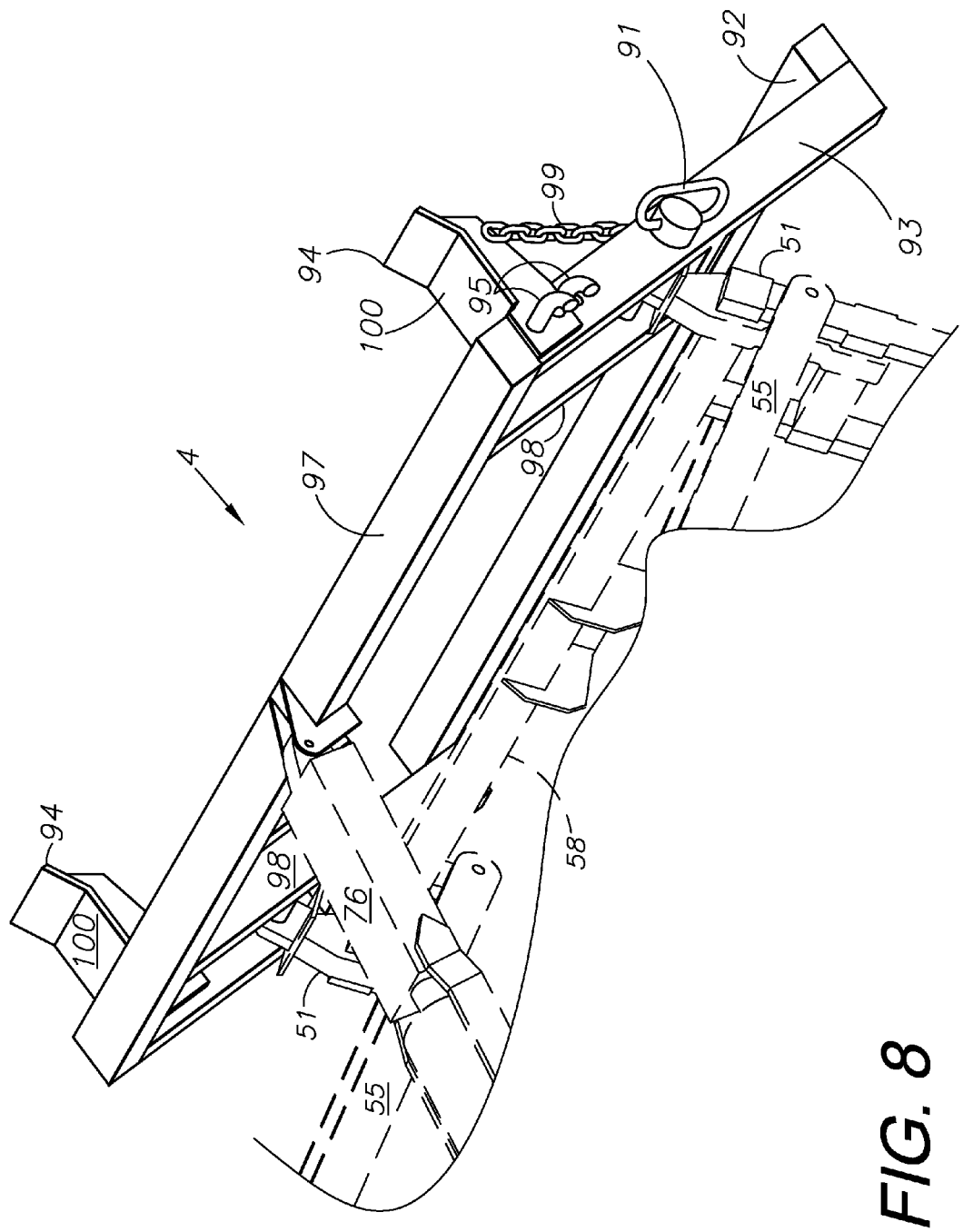
FIG. 8 is an enlarged, isometric view of the header adapter from FIG. 6, shown with three point hitch connectors of the load lift assembly attached thereto.
Figure 9:
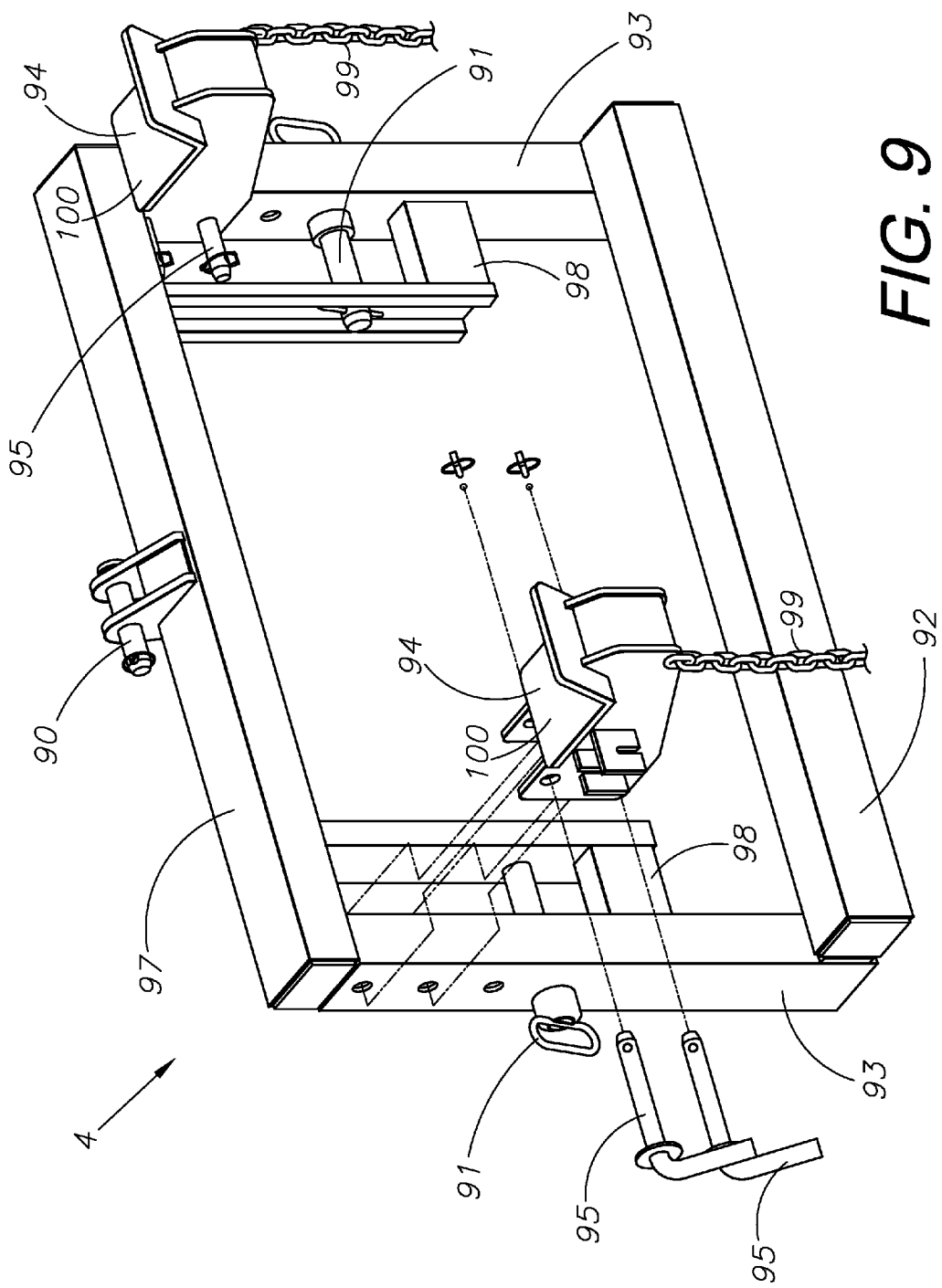
FIG. 9 is an isometric view of the header adapter showing the header adapter brackets and the three-point hitch connection pins.

Referring to FIGS. 8 and 9, a header adapter 4 comprising a head lift adapter 92 is attached at both of its ends to a pair of vertical header members 93; a horizontal header member 97 is attached on either of its ends to the opposite ends of the pair of vertical header members 93; a pair of head adapter brackets 94 are each attached to the vertical header members 93; multiple header adapter bracket pins 95 are adapted for connecting the header adapter brackets 94 to the vertical header members 93; a pair of lower header pins 91 and an upper header pin 90 are adapted for connecting the header adapter 4 to the load lift assembly 2 by the three point hitch connectors 60 and 79; and a pair of header elbows 98 are each attached to the horizontal header member 97 and to a respective vertical header member 93. The header adapter brackets 94 form hooks 100 receiving a header 19. The lower header pins 91 connect to the header adapter 4 and extend through the vertical header members 93 and the header elbows 98. A load, such as a combine header, can be placed on and transported by the trailer 1 by mounting the header adapter 4 on the load lift assembly 2, as described above. Chains 99 are attached to each header adapter bracket 94 and are adapted for wrapping around part of a combine header and thereby securing it to the header adapter 4.

Figure 11:
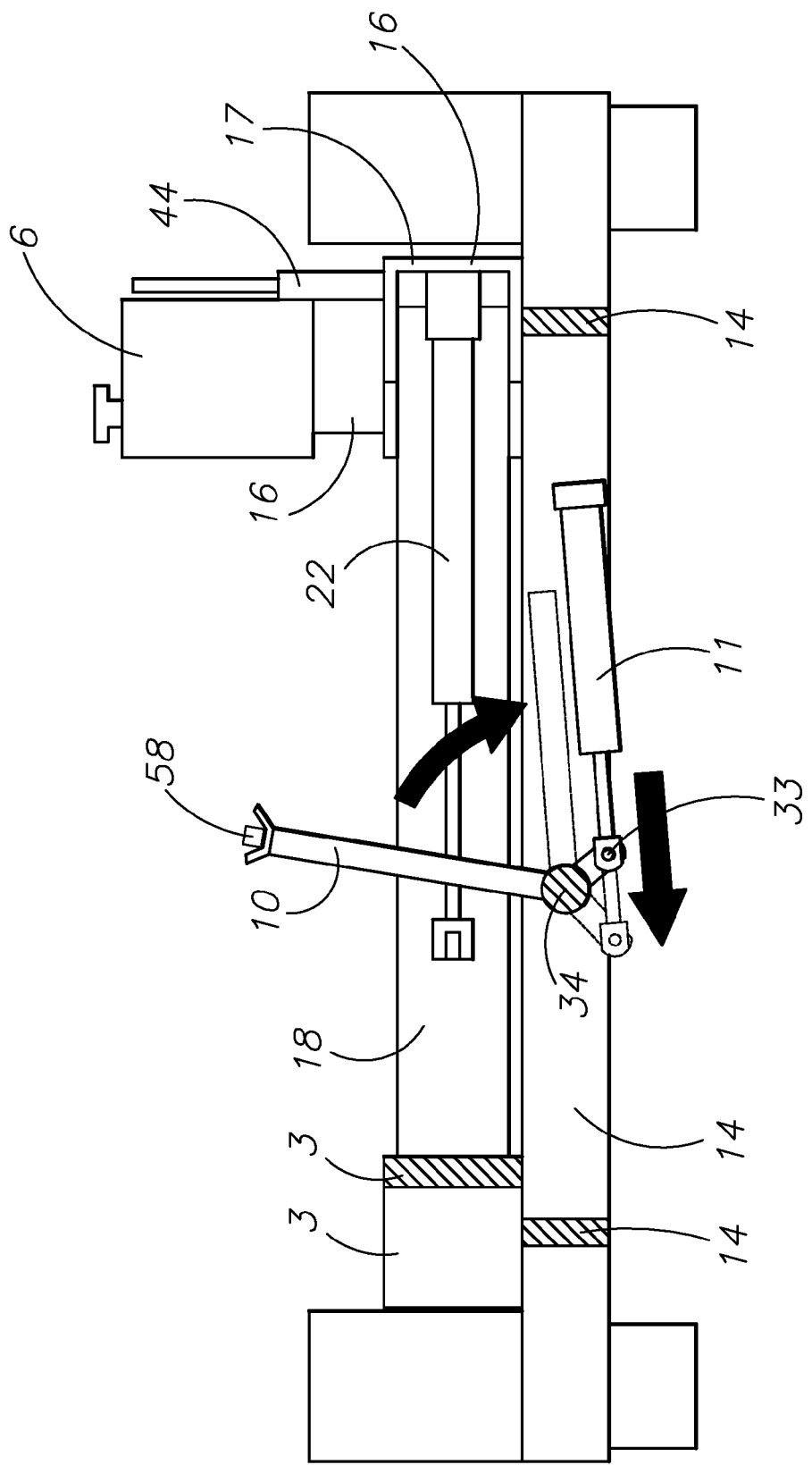
FIG. 11 is a sectional view taken generally along line 11-11 in FIG. 10 showing the movement of a stow lock from a support position to a storage position as a stow lock cylinder is extended.
Figure 12:
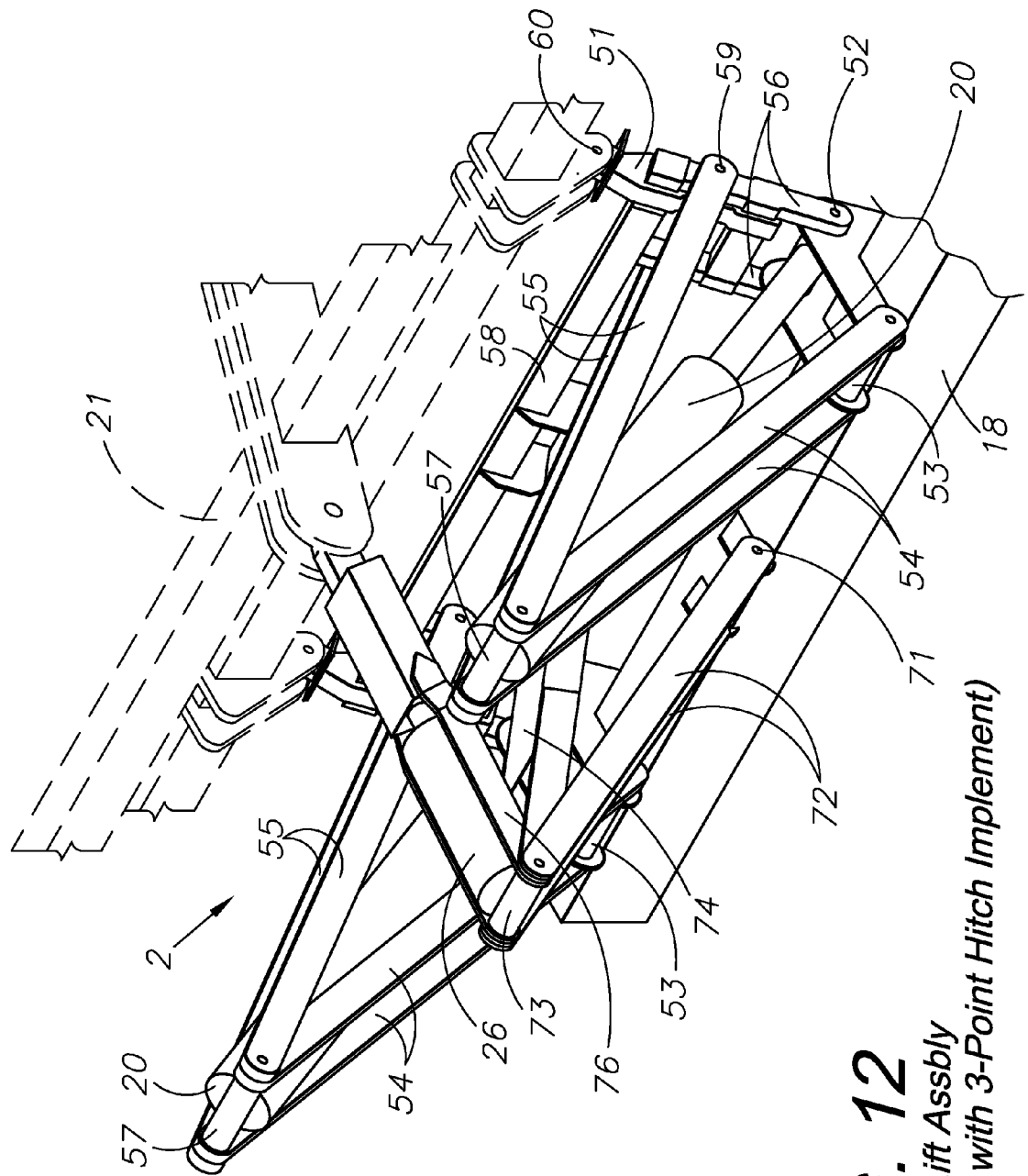
FIG. 12 is an isometric view of the load lift assembly, shown with a three point hitch implement connected thereto.
Figure 13A:
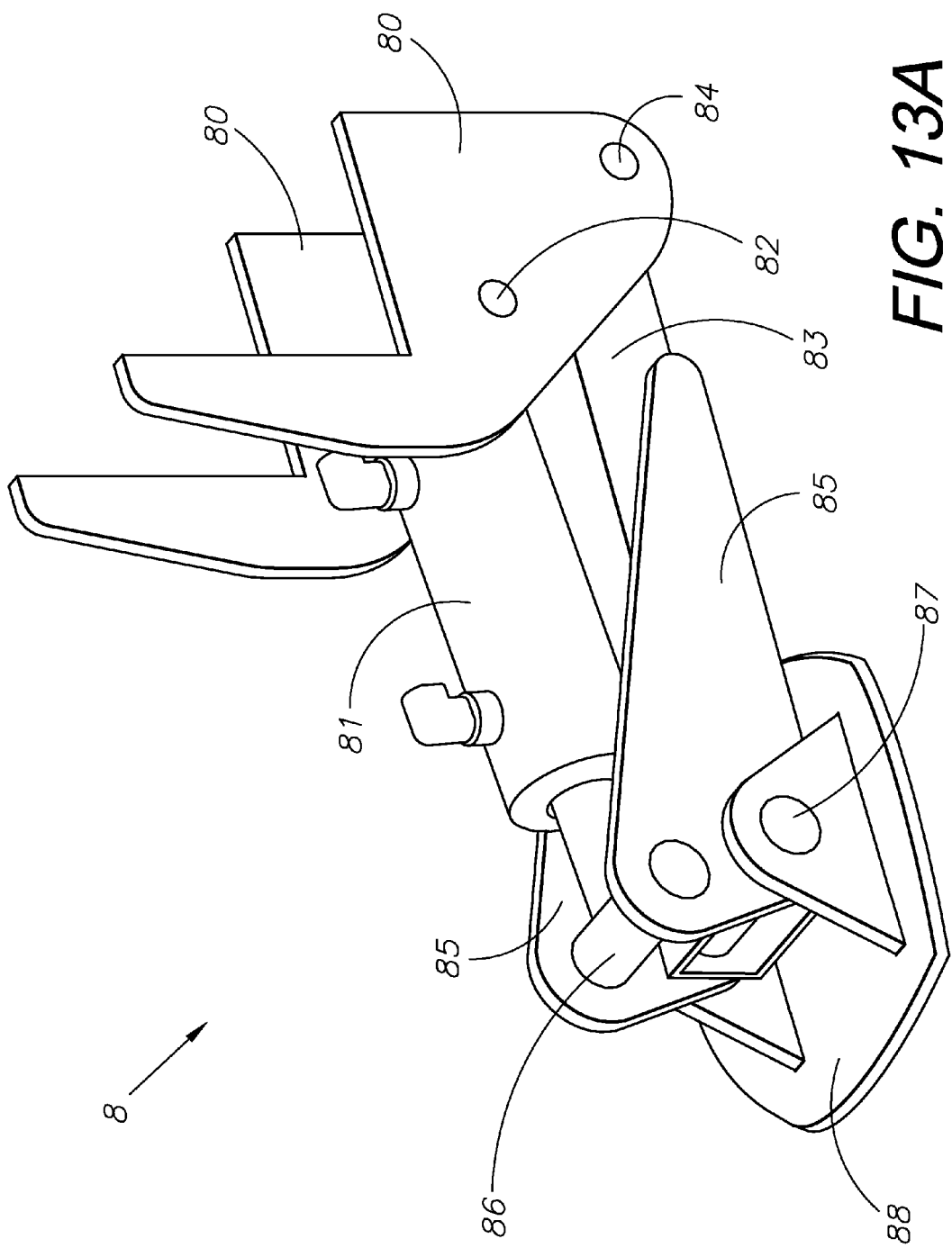
FIG. 13A is an enlarged, isometric view of a stabilizer.
Figure 13B:
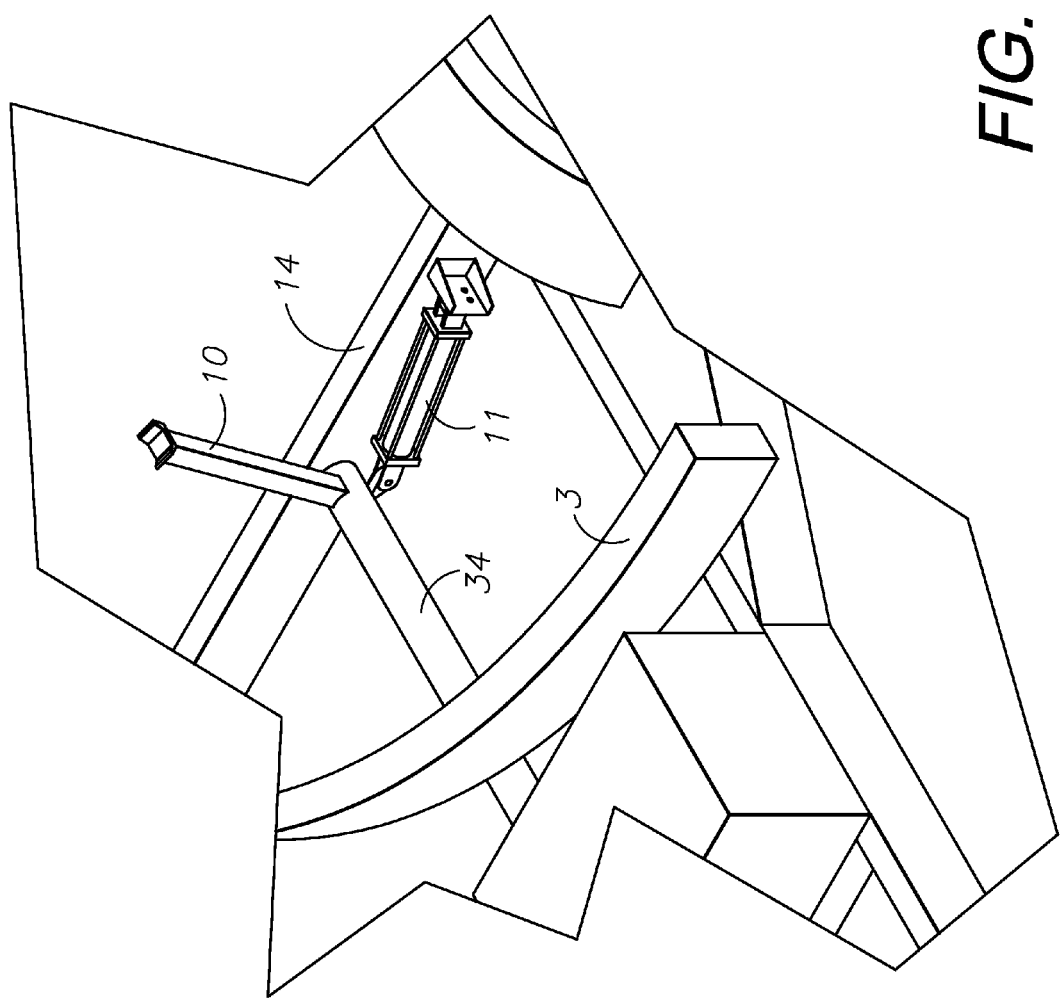
FIG. 13B is an enlarged, isometric view, particularly showing the stow lock, the stow lock cylinder and a stow lock rotation shaft.

Referring to FIGS. 11 and 13B, a stow lock 10, having first and second ends, is attached at its first end to a stow lock pivot member 34. The stow lock pivot member 34 is rotatably attached at each end to the trailer frame 14 and is rotatable between a first, lowered position adapted to allow clearance for the rotator arm 18 to pass over the stow lock 10 and a second, raised position adapted for the second end of the stow lock 10 to engage and support the lift arm crossbar 58. A stow lock cylinder 11 having first and second ends is attached at its first end to the trailer frame 14 and is attached at its second end to the stow lock pivot member 34 by a stow lock pin 33. The stow lock cylinder 11 actuates the movement of the stow lock 10 between its raised and lowered positions.

Figure 10:
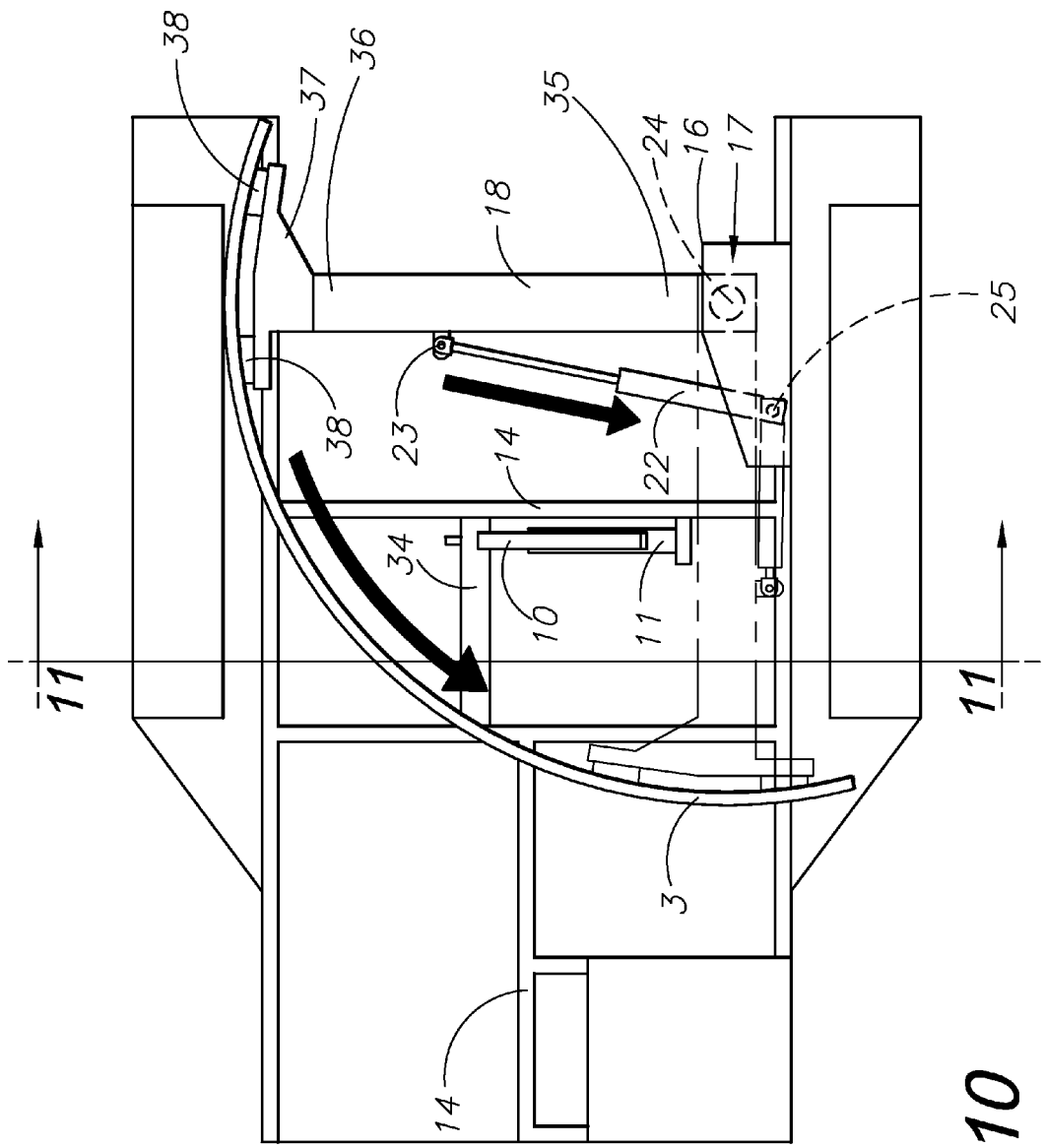
FIG. 10 is a top plan view showing the movement of a rotator arm and a rotator arm guide along a rotation track as a rotation cylinder is retracted.

Referring to FIG. 10, the rotator arm guide 37 is attached to the rotator arm second end 36 in the preferred embodiment and has two guide wheels 38. The weight of the load lift assembly 2 along with the weight of the load attached to it, such as the header adapter 4 and/or an implement 19, is supported on the trailer frame 14 by the two guide wheels 38 engaging the rotation track 3, and the pin assembly 17. In addition to carrying the weight as described above, the two guide wheels 38 provide stabilization to the load lift assembly 2 by distributing the weight forward of and behind the rotator arm 18. Further, the use of a rotator arm guide 37 provides a wider base along which to space the guide wheels 38, thus providing even greater stabilization of the load lift assembly 2.

Referring to FIGS. 1, 10 and 11, the pin assembly housing 16 supports a hydraulic reservoir 6 and a hydraulic valve assembly 44. The hydraulic valve assembly 44 is used to control the hydraulic system 41, and thus the lifting and rotating of the rotating lift system 1. A unique feature of the vehicle loading system 1 is the location of the hydraulic valve assembly 44, which location enables an operator to control the lifting and rotating mechanisms of the rotating lift system 1 from a single location.

Figure 3:
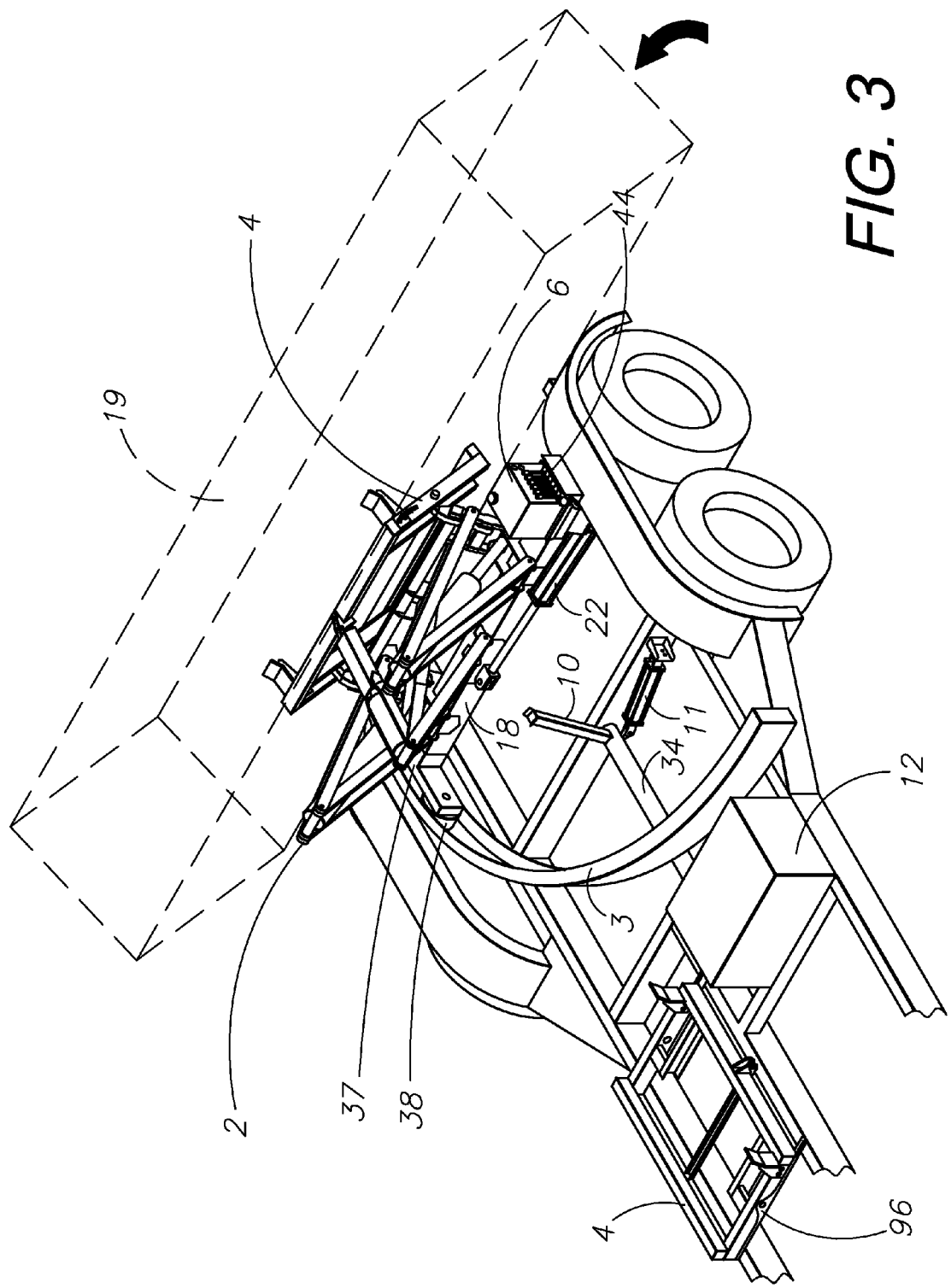
FIG. 3 is an isometric view of the rotating lift system with the load lift assembly in a raised, loading position.
Figure 4:
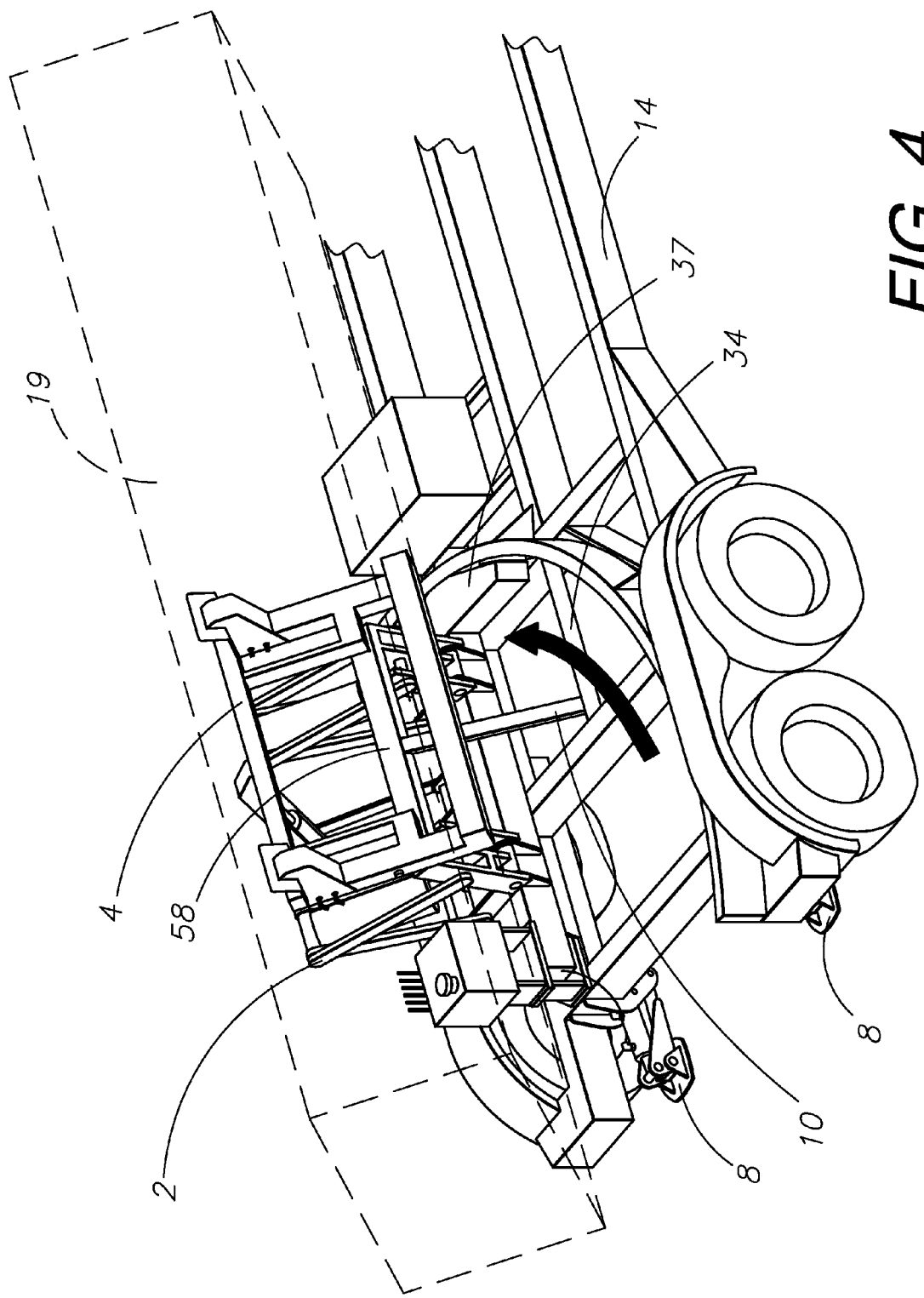
FIG. 4 is an enlarged, isometric view taken generally within the circle shown in FIG. 1 of the rotating lift system of the present invention with the load lift assembly in a raised, rotated, transport position.
Figure 5:
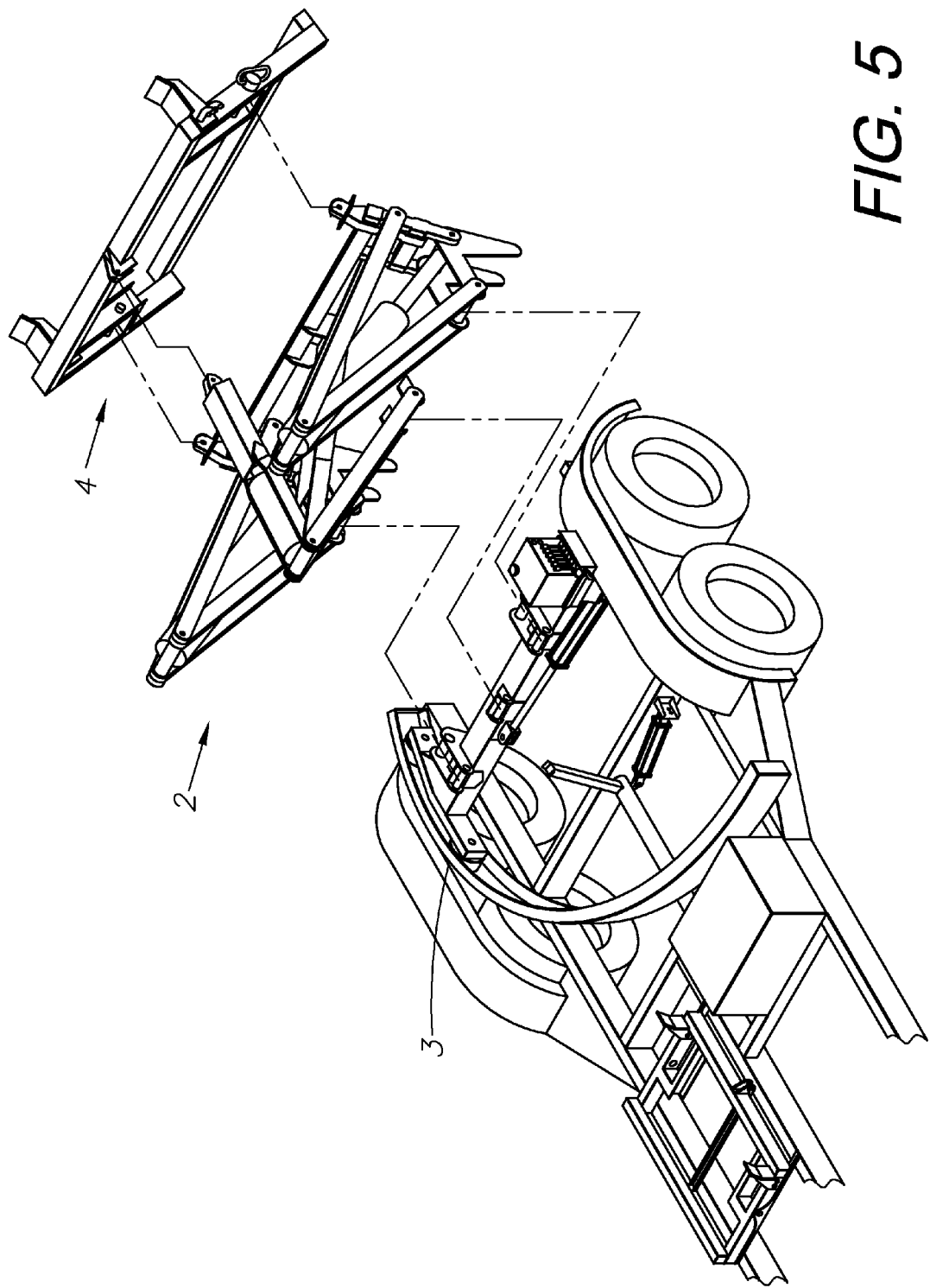
FIG. 5 is an exploded, isometric view of the rotating lift system.
Figure 6:
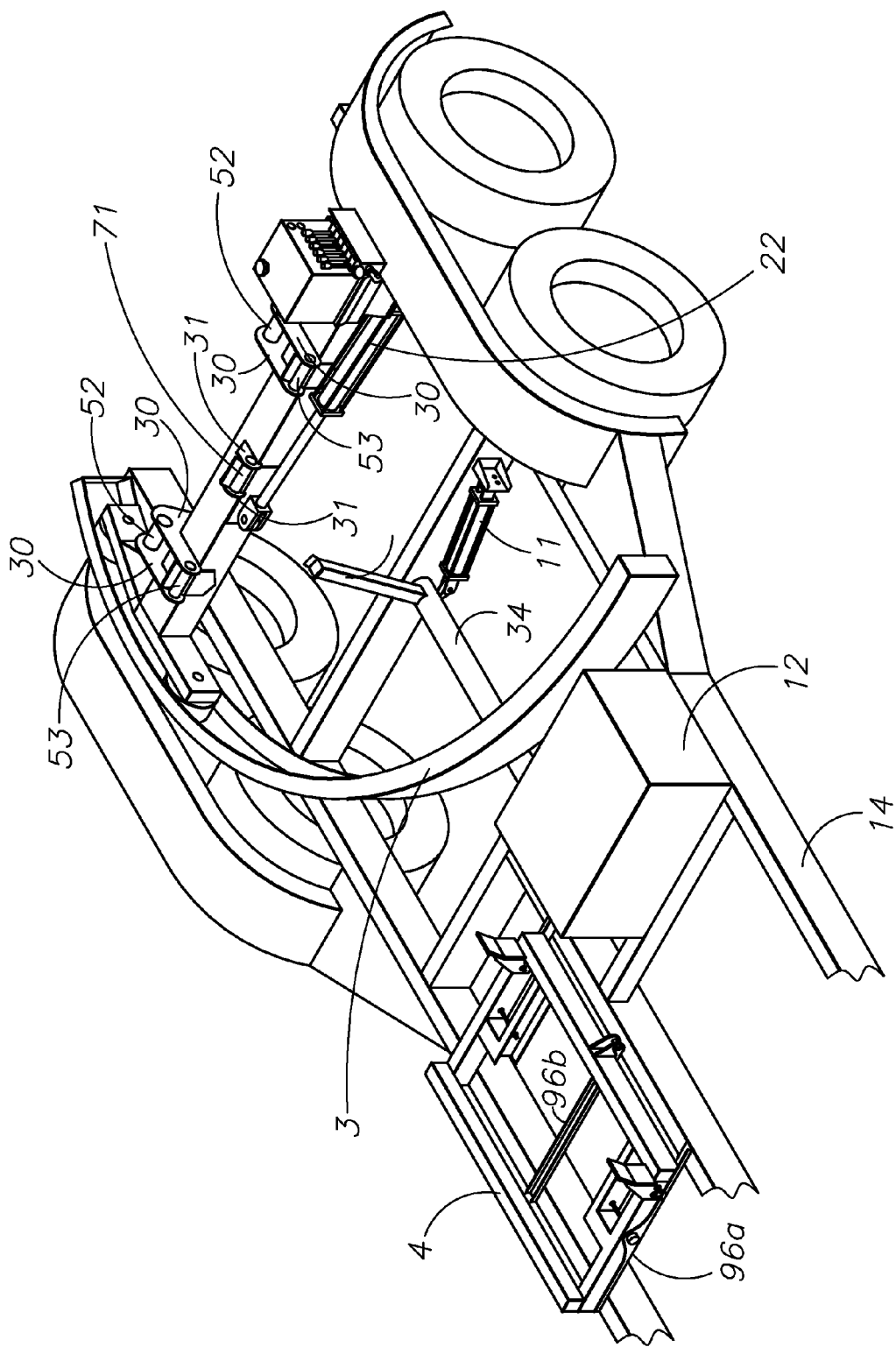
FIG. 6 is an enlarged, isometric view of the rotating lift system, shown without the load lift assembly.
Figure 7:
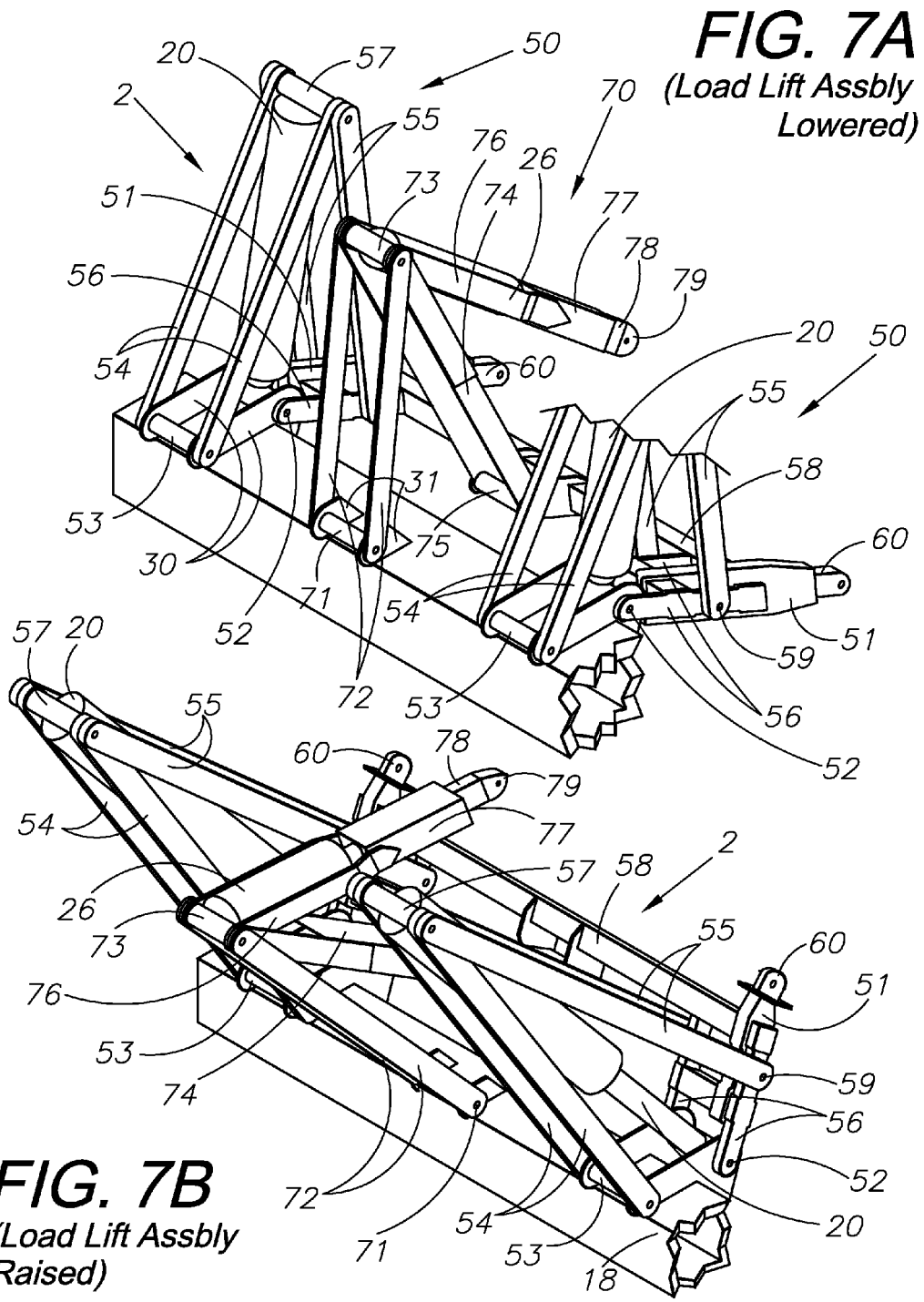
FIG. 7A and FIG. 7B are isometric views of the load lift assembly in raised and lowered positions, respectively.

Referring to FIGS. 2, 3, 4, 7A and 7B, a method of lifting an implement 19 or 21 comprises a three step process where first the load lift assembly 2 attaches to the implement 19 or 21, second the load lift assembly 2 lifts the implement 19 or 21 to a raised position (as shown in FIG. 3), and third the rotator arm 18 rotates the load lift assembly 2 and the attached implement 19 or 21 to a transport position (as shown in FIG. 4). The implement 21 includes a three point hitch connection and is attached to the rotating lift system 1 by attaching the three-point hitch connectors, the lower connectors 60 and the upper connector 79 to the implement 21.

The implement 19 includes a header connection and is attached to the rotating lift system 1 by positioning the header adapter 4 at a point where the implement 19 rests on the header adapter brackets 94 and against the header lift adapter 92. The implement 19 or 21 is raised by the lower lift arms 51 being raised by the extension of the lift cylinders 20. The implement 19 or 21 is rotated to a transport position as the rotator arm 18 rotates about the rotator arm pin 24. To further stabilize and secure the loaded implement 19 for transport, the stow lock 10 is rotated into its raised position and engages the lift arm cross bar 58.

Figure 14:
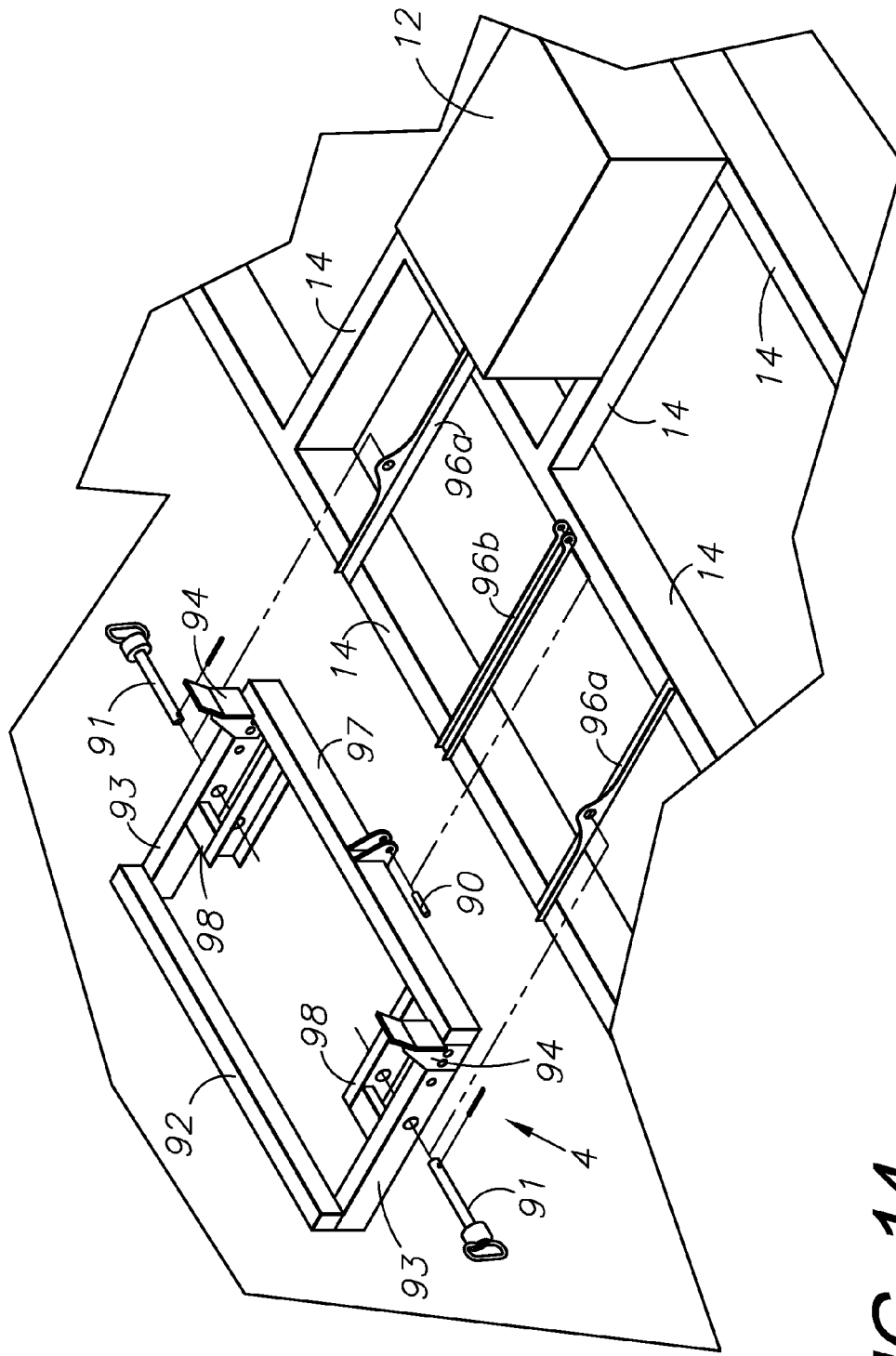
FIG. 14 is an enlarged, isometric view, particularly showing the header adapter and a header adapter storage bracket.
Figure 17:
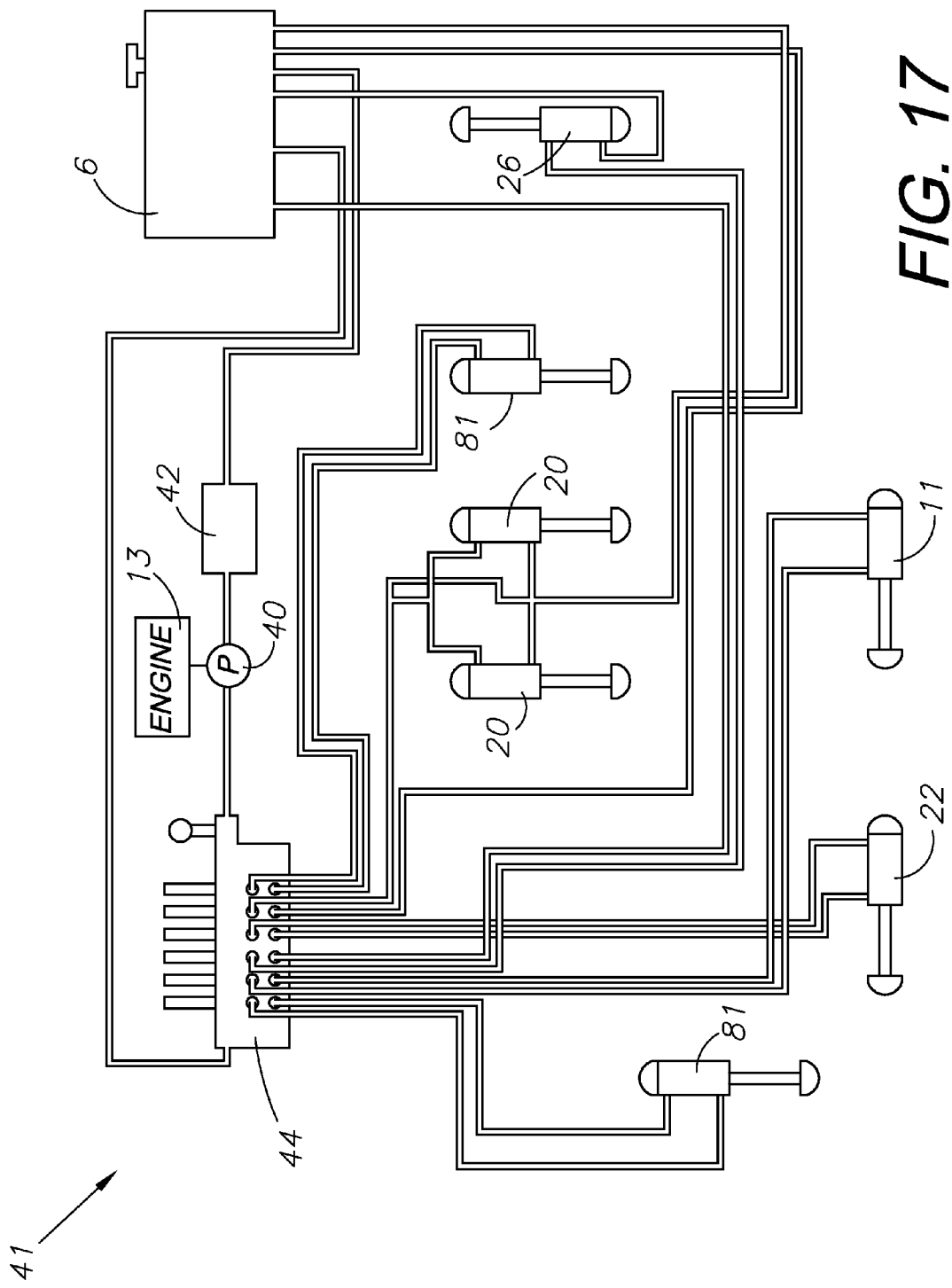
FIG. 17 is a schematic diagram of the hydraulic system.

Referring to FIG. 14, header adapter storage brackets 96a, 96b are attached to the trailer frame 14. When not in use, the header adapter 4 can be stored in the header adapter storage brackets 96a, 96b by securing it with the lower header pins 91 and the upper header pin 90. Referring to FIG. 17, a hydraulic system 41 is attached to various points as defined above and is connected by hoses (FIG. 17) and is operated in a conventional manner. The hydraulic system 41 includes a pump 40 driven by the engine 13, which hydraulically connects to the other hydraulic system components via a filter 42.

Referring to FIGS. 1 and 13A, each stabilizer 8 attached to the rear of the trailer frame 14 comprises a pair of stabilizer trailer brackets 80, a stabilizer cylinder 81, a stabilizer cylinder trailer pin 82, a stabilizer link 83, a stabilizer link trailer pin 84, a pair of stabilizer brackets 85, a stabilizer cylinder pin 86, a stabilizer link pin 87, and a stabilizer pad 88. The stabilizer trailer brackets 80 are attached to the trailer frame 14. Each stabilizer cylinder 81 is attached at its first end to a stabilizer trailer bracket 80 by a stabilizer cylinder trailer pin 82. Each stabilizer cylinder 81 second end is attached to a respective stabilizer bracket 85 by a stabilizer cylinder pin 86. Each stabilizer link 83 has a first end attached to the stabilizer trailer brackets 80 by a stabilizer link trailer pin 84 and a second end attached to a stabilizer bracket 85 by a stabilizer link pin 87. Each stabilizer pad 88 is attached to a respective stabilizer link 83 by a respective stabilizer link pin 87.

When loading an implement 19, the combined weight of the rotating lift system 1 and the implement 19 is transferred to the stabilizers 8 from the wheels 28 and 29 by lowering the stabilizer 8. The stabilizers 8 are lowered by the stabilizer cylinders 81 extending causing the stabilizer pads 88 and stabilizer links 83 to rotate counterclockwise in an arcuate path until the stabilizer pad 88 engages the ground and lifts the rotating lift system 1 enough to effectuate the weight transfer.

Figure 15:
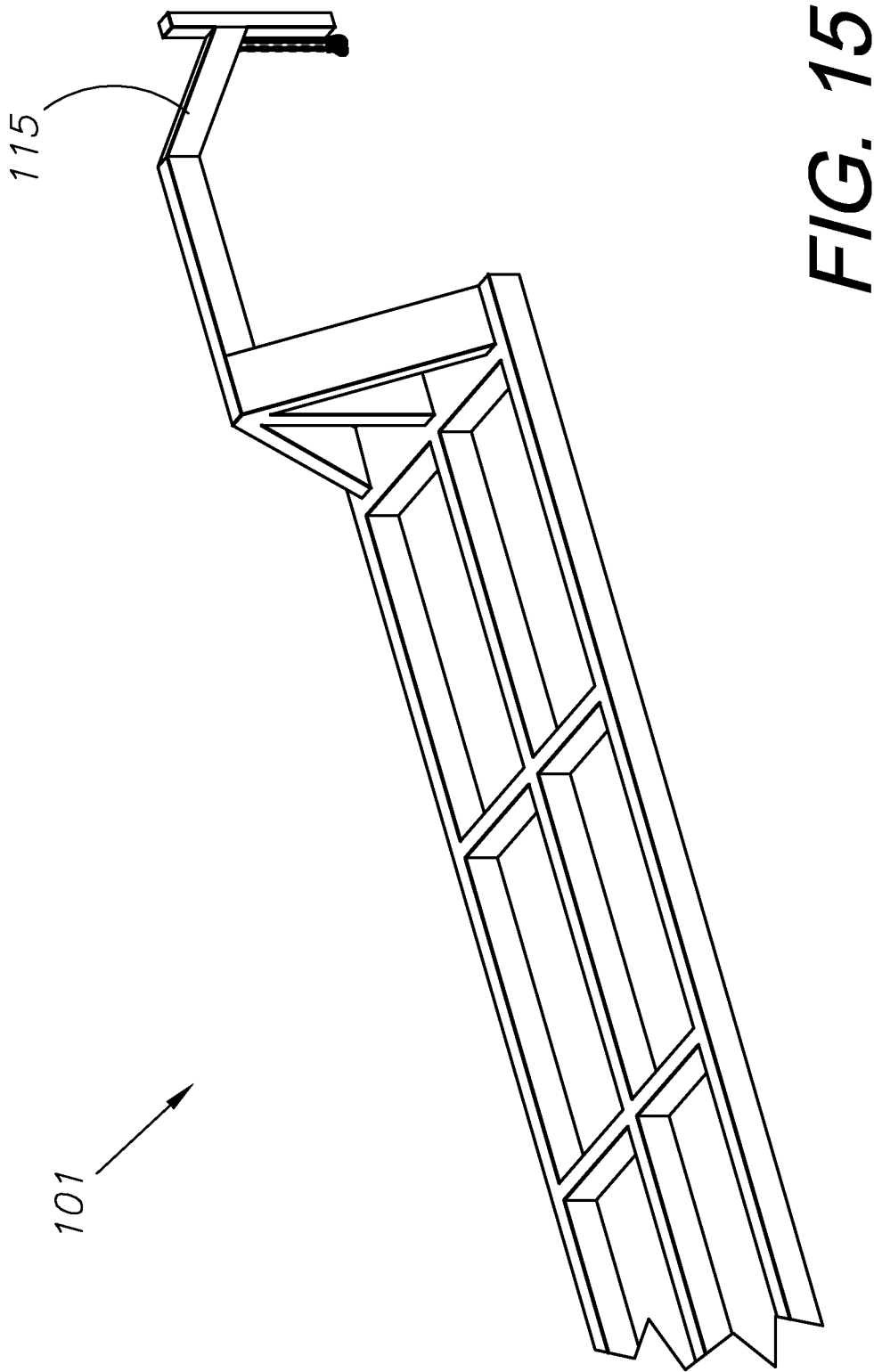
FIG. 15 is an enlarged, isometric view, particularly showing a modified trailer frame with a gooseneck attachment.

Referring to FIG. 1, the rotating lift system 1 is shown with a bumper pull trailer hitch 15. Referring to FIG. 15, an alternative embodiment rotating lift system 101 is shown with a gooseneck trailer hitch 115. FIG. 16 shows sloped header adapter brackets 194, which are an alternative to the header adapter brackets 94 for accommodating combine headers and other loads with structural configurations corresponding to the alternative header adapter brackets 194. It will be appreciated that other adapters can be utilized with the trailer 1 for loading and transporting a variety of loads with various configurations in multiple sizes.

It is to be understood that the invention can be embodied in various forms, and is not to be limited to the examples discussed above. The range of components and configurations which can be utilized in the practice of the present invention is virtually unlimited.

Having thus described the disclosed subject matter, what is claimed as new and desired to be secured by Letters Patent is:

1. A system for placing a load on a vehicle including a vehicle frame and a vehicle longitudinal axis, which load-placing system comprises:
   a single arcuate rotation track mounted on said vehicle frame and forming an arcuate path of rotation centered on a generally vertical rotational axis;
   said single arcuate rotation track comprising a vertically aligned channel member;
   a rotator assembly including a rotator arm with a proximate end rotatably mounted on said vehicle frame and rotatable about said rotational axis;
   said rotator arm including a distal end;
   said rotator arm distal end mounting a rotator arm guide engaging said rotation track, said rotator arm guide being adapted for movement along said rotation track;
   said rotator arm being rotatable between first and second positions with respect to said frame;
   a load lift assembly mounted on said rotator arm and having a first, lowered position adapted for connecting to the load and a second, raised position adapted for positioning the load over said vehicle frame;

a lift actuator connected to said load lift assembly and adapted for moving said load lift assembly between its lowered and raised positions;
a stow lock assembly rotatably mounted on said frame;
said stow lock assembly being rotatable between a first, lowered position and a second, raised position adapted for engaging said load lift assembly; and
a stow lock actuator connected to said frame and to said stow lock assembly and adapted for rotating said stow lock assembly between its first and second positions.

2. The loading system according to claim 1, which includes:
a rotation actuator connected to said frame and to said rotator arm and adapted for rotating said rotator arm between its first and second positions.

3. The loading system according claim 2, which includes:
said rotation actuator comprising a piston-and-cylinder unit with first and second ends connected to said frame and to said rotator arm respectively; and
a hydraulic system including a hydraulic pump and valve for selectively, hydraulically powering said piston-and-cylinder unit.

4. The loading system according to claim 1, which includes:
a stabilizer assembly connected to said frame and adapted for stabilizing said frame while a load is lifted; and
said stabilizer assembly being movable between a lowered position engaging a ground surface and a raised position disengaged from the ground surface.

5. The loading system according to claim 4, which includes:
a stabilizer actuator connected to said frame and to said stabilizer assembly and adapted for raising and lowering said stabilizer assembly.

6. The loading system according to claim 1 adapted for loading and transporting a combine header, which loading system includes:
a header adapter including a horizontal header adapter bracket, a horizontal header member and a pair of generally vertical header members;
said vertical header members extending between said horizontal header adapter bracket and said horizontal header member and collectively forming a generally frame-shaped configuration;
said header adapter including a pair of header elbows each attached to a respective vertical header members and to said horizontal header member;
said header elbows and said header lift adapter being adapted for connection to a three-point hitch; and
said header adapter including a pair of header adapter brackets each mounted on a respective vertical header member and adapted for mounting a combine header.

7. The loading system according to claim 6 wherein each said header adapter bracket forms an upwardly-open hook adapted for receiving a combine header structural member whereby said combine header is retained on said header adapter.

8. The loading system according to claim 6, which includes:
a storage bracket connected to said frame and adapted for storing said header adapter.

9. The loading system according to claim 1, which includes:
a tow connection connected to said frame and adapted for hitching said load-placing system frame to a tow vehicle.

10. The loading system according to claim 9, wherein said tow connection comprises a bumper pull hitch.

11. The loading system according to claim 9, wherein said tow connection comprises a goose-neck hitch.

12. A system for placing a load on a vehicle including a vehicle frame and a vehicle longitudinal axis, which load-placing system comprises:
a single arcuate rotation track mounted on said vehicle frame and forming an arcuate path of rotation centered on a generally vertical rotational axis;
said single arcuate rotation track comprising a vertically aligned channel member;
a rotator assembly including a rotator arm with a proximate end rotatably mounted on said vehicle frame and rotatable about said rotational axis;
said rotator arm including a distal end;
said rotator arm distal end mounting a rotator arm guide engaging said rotation track, said rotator arm guide being adapted for movement along said rotation track;
said rotator arm being rotatable between first and second positions with respect to said frame;
a load lift assembly mounted on said rotator arm and having a first, lowered position adapted for connecting to a load and a second, raised position adapted for positioning the load over said frame;
a lift actuator connected to said load lift assembly and adapted for moving said load lift assembly between its lowered and raised positions;
a rotate actuator connected to said frame and to said rotator arm and adapted for rotating said rotator arm between its first and second positions;
an extend actuator connected to said load lift assembly and adapted for aligning said load lift assembly to a load;
a stabilizer assembly connected to said frame and adapted for stabilizing said frame while a load is lifted;
said stabilizer assembly being movable between first and second positions;
a stabilize actuator connected to said frame and to said stabilizer assembly and adapted for lowering said stabilizer assembly between its first and second positions;
a stow lock assembly rotatably mounted on said frame;
said stow lock assembly being rotatable between a first, lowered position and a second, raised position adapted for engaging said load lift assembly;
a stow lock actuator connected to said frame and to said stow lock assembly and adapted for rotating said stow lock assembly between its first and second positions;
a header adapter connected to said load lift assembly including a frame and adapted for connecting to a load;
said header adapter including a lift bar attached to said header adapter frame and adapted for connecting to a load, a pair of lift brackets adjustably mounted to said header adapter frame and adapted for connecting to a load, and a connection assembly attached to said header adapter frame for connecting to a loading system;
a storage bracket connected to said frame and adapted for storing said header adapter; and
a tow connection connected to said frame and adapted for hitching said frame to a tow vehicle.

13. The loading system according to claim 12, wherein said pair of lift brackets comprise sloped lift brackets.

14. The loading system according to claim 12, wherein said tow connection comprises a bumper pull hitch.

15. The loading system according to claim 12, wherein said tow connection comprises a goose-neck hitch.

* * * * *